(12) United States Patent
Wang et al.

(10) Patent No.: US 10,652,900 B2
(45) Date of Patent: May 12, 2020

(54) NETWORK NODE, A WIRELESS DEVICE AND METHODS THEREIN FOR ENABLING CHANNEL ESTIMATIONS IN A WIRELESS COMMUNICATIONS NETWORK

(71) Applicant: Telefonaktiebolaget LM Ericsson (publ), Stockholm (SE)

(72) Inventors: Meng Wang, Sundbyberg (SE); Luis Felipe Del Carpio Vega, Espoo (FI); Dzevdan Kapetanovic, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/562,283

(22) PCT Filed: Apr. 2, 2015

(86) PCT No.: PCT/SE2015/050412
§ 371 (c)(1),
(2) Date: Sep. 27, 2017

(87) PCT Pub. No.: WO2016/159849
PCT Pub. Date: Oct. 6, 2016

(65) Prior Publication Data
US 2018/0249471 A1    Aug. 30, 2018

(51) Int. Cl.
*H04W 72/04* (2009.01)
*H04W 72/08* (2009.01)
(Continued)

(52) U.S. Cl.
CPC ........ *H04W 72/082* (2013.01); *H04B 17/309* (2015.01); *H04L 5/0016* (2013.01);
(Continued)

(58) Field of Classification Search
CPC ........... H04W 72/082; H04W 72/0426; H04W 74/0808; H04W 74/006; H04W 84/12; H04L 25/0204; H04B 17/309
See application file for complete search history.

(56) References Cited

U.S. PATENT DOCUMENTS

2005/0058151 A1    3/2005  Yeh
2014/0056204 A1    2/2014  Suh et al.
(Continued)

FOREIGN PATENT DOCUMENTS

WO    2014029368 A1    2/2014
WO    2015172802 A1    11/2015

OTHER PUBLICATIONS

Perahia et al. "Next Generation Wireless LANs", 2nd Edition, Cambridge University Press, Published Jun. 2013, Chapter 8 Section 8.3 Distributed channel access, consisting of pp. 228-231, 4 pages.
(Continued)

*Primary Examiner* — Hassan Kizou
*Assistant Examiner* — Mahbubul Bar Chowdhury
(74) *Attorney, Agent, or Firm* — Sage Patent Group

(57) ABSTRACT

Embodiments herein relate to a method performed by a network node for enabling channel estimation in a wireless communications network. The wireless communications network includes at least a first and a second Access Point, AP, having overlapping cells using contention-based transmission resources of the same frequency. The first network node controls the first AP to transmit information indicating that wireless devices served by the first AP are not to contend for the contention-based transmission resources when the second AP is transmitting a Null Data Packet, NDP. Then, the first network node controls the second AP to transmit a NDP. Embodiments of the first network node are also described. Embodiments herein also relate to a method
(Continued)

performed by a wireless device for enabling channel estimation in a wireless communications network, and embodiments of the wireless device.

14 Claims, 6 Drawing Sheets

(51) Int. Cl.
| | |
|---|---|
| *H04W 74/08* | (2009.01) |
| *H04B 17/309* | (2015.01) |
| *H04W 74/00* | (2009.01) |
| *H04L 5/00* | (2006.01) |
| *H04L 25/02* | (2006.01) |
| *H04W 84/12* | (2009.01) |

(52) U.S. Cl.
CPC ..... *H04L 25/0204* (2013.01); *H04W 72/0426* (2013.01); *H04W 74/006* (2013.01); *H04W 74/008* (2013.01); *H04W 74/0808* (2013.01); *H04W 84/12* (2013.01)

(56) References Cited

U.S. PATENT DOCUMENTS

| | | | | |
|---|---|---|---|---|
| 2014/0056205 A1* | 2/2014 | Aboul-Magd | .... | H04W 72/0426 370/312 |
| 2014/0153415 A1* | 6/2014 | Choudhury | ....... | H04W 72/0446 370/252 |
| 2014/0269628 A1* | 9/2014 | Ghosh | ................... | H04W 74/04 370/336 |
| 2014/0328195 A1* | 11/2014 | Sampath | ............. | H04W 72/082 370/252 |
| 2014/0348097 A1 | 11/2014 | Park et al. | | |
| 2015/0016435 A1* | 1/2015 | Hedayat | ................ | H04W 76/15 370/338 |
| 2015/0131511 A1* | 5/2015 | Ghosh | ................... | H04W 16/14 370/312 |
| 2015/0146807 A1* | 5/2015 | Zhang | ................... | H04L 5/0007 375/260 |
| 2015/0173010 A1* | 6/2015 | Ghosh | .................... | H04W 48/20 370/329 |
| 2015/0295629 A1* | 10/2015 | Xia | ...................... | H04B 7/0491 370/329 |
| 2015/0341807 A1* | 11/2015 | Jeffery | .................... | H04L 5/005 370/254 |
| 2016/0165630 A1* | 6/2016 | Oteri | ..................... | H04W 74/04 370/336 |

OTHER PUBLICATIONS

International Search Report and Written Opinion dated Dec. 23, 2015 for International Application Serial No. PCT/SE2015/050412, International Filing Date: Apr. 2, 2015 consisting of 10-pages.

Oteri et al. "Advanced Power Control Techniques for Interference Mitigation in Dense 802.11 Networks" ISSN:1882-5621/13; Conference Location and Date: Atlantic City, NJ, USA Jun. 24-27, 2013 consisting of 7-pages.

Stankovic et al. "Generalized Design of Multi-User MIMO Precoding Matrices" IEEE Transactions on Wireless Communications, vol. 7, No. 3, Mar. 14, 2008 consisting of 9-pages.

Oh Jinhyung et al: "Performance comparison of cooperative downlink transmission schemes in IEEE 802.11ac: Interference alignment vs. MU-MIMO with TDMA", 2014 International Conference on Information and Communication Technology Convergence (ICTC), IEEE, Oct. 22, 2014 (Oct. 22, 2014), pp. 200-205, XP032704775, DOI: 10.1109/ICTC.2014.6983117.

Jones VK et al: "Emerging technologies for WLAN", IEEE Communications Magazine, IEEE Service Center, Piscataway, US, vol. 53, No. 3, Mar. 1, 2015 (Mar. 1, 2015), pp. 141-149, XP011575834, ISSN: 0163-6804, DOI : 10.1109/MCOM.2015.7060496.

European search opinion dated Oct. 22, 2018, Issued in European Application No. EP15887925, consisting of 5 pages.

Communication regarding the transmission of the European search report dated Oct. 22, 2018, Issued in European Application No. EP15887925, consisting of 1 page.

Supplementary European Search Report dated Oct. 22, 2018, Issued in European Application No. EP15887925 consisting of 2 page.

\* cited by examiner

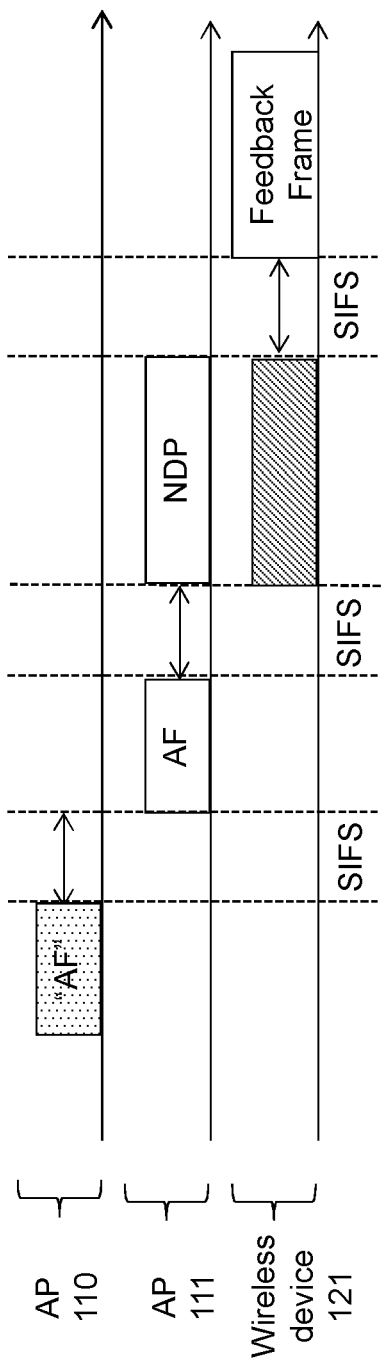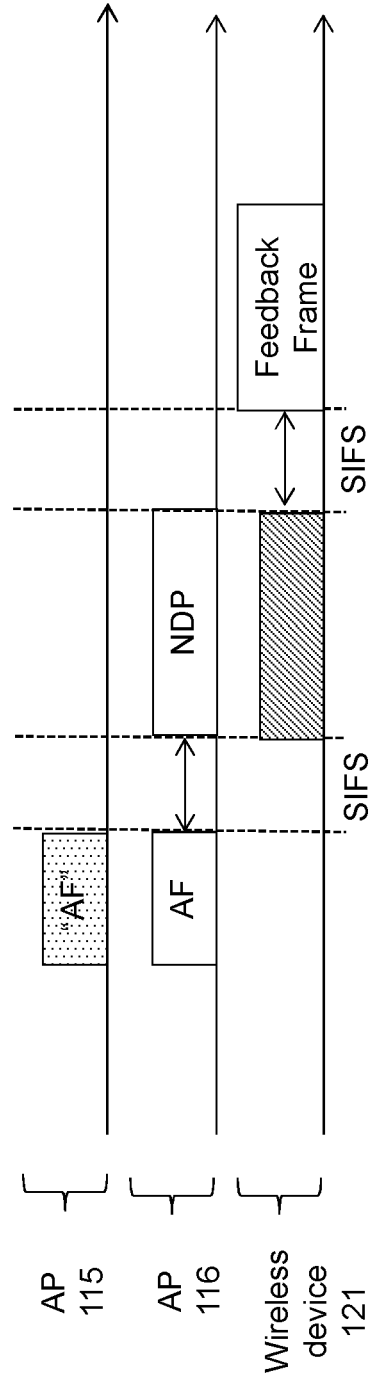

NETWORK NODE, A WIRELESS DEVICE AND METHODS THEREIN FOR ENABLING CHANNEL ESTIMATIONS IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application Number: PCT/SE2015/050412, filed Apr. 2, 2015 entitled "A NETWORK NODE, A WIRELESS DEVICE AND METHODS THEREIN FOR ENABLING CHANNEL ESTIMATIONS IN A WIRELESS COMMUNICATIONS NETWORK," the entirety of which is incorporated herein by reference.

TECHNICAL FIELD

Embodiments herein relate to channel estimation in a wireless communications network. In particular, embodiments herein relate to a network node, a wireless device and methods therein for enabling channel estimations in a wireless communications network.

BACKGROUND

One example of a wireless communications network using contention-based transmission resources of the same frequency is the standardized IEEE 802.11 Wireless LAN, WLAN. Here, a Basic Serving Set, BSS, is regarded the basic building block of the wireless communications network. The BSS comprise an Access Point, AP, and a number of stations, STAs, located within a certain coverage area or cell being served by the AP. Within a BSS, the transmission between the AP and the STAs is typically performed in a distributed manner. This means that before a transmission, a STA first performs a Clear Channel Assessment, CCA, by sensing the transmission medium for a specific period of time. If the transmission medium is deemed idle, then access is assigned to this STA for transmission; otherwise, the STA typically has to wait a random back-off period and then again check whether the transmission medium is idle and thus available to the STA. The random back-off period provides a collision avoidance mechanism for multiple STAs that wish to transmit in the same BSS. In this case, the above contention-based channel access is commonly referred to as a distributed coordination function, DCF, in the IEEE 802.11 WLAN standard.

In order to avoid interference in wireless communications networks using contention-based transmission resources of the same frequency, different frequencies, or channels, should be assigned to neighbouring or nearby BSSs. However, in dense deployment scenarios, it is likely that frequencies or channels will be reused even for neighbouring or nearby BSSs. In this case, resulting co-channel interference between the BSSs is expected to compromise the performance or Quality-of-Service, QoS, offered to the STAs by the BSSs. In particular, STAs that are located within an overlapping coverage area of the BSSs may, due to relatively strong interference, be more severely affected. In the IEEE 802.11 WLAN standard, this is commonly referred to as having Overlapping Basic Service Sets, OBSSs.

One problem created by co-channel interference is that when the interference from one BSS is not adequately strong to influence the channel access in another BSS, simultaneous transmission in the overlapping coverage areas will lead to a lower signal-to-noise-plus-interference, SINR, ratio in both BSSs, and therefore affect the performance and QoS in both BSSs. Another problem created by co-channel interference is that due to the contention-based channel access in the BSSs, the interference from a first BSS could be detected as the frequency or channel being busy by a second BSS, whereby the second BSS may defer its transmissions by mistake. In extreme cases, continuous co-channel interference may block the transmission at several BSSs. Hence, this type of co-channel interference in such dense deployed wireless communications networks will lead to significant losses in performance and QoS and thus should preferably be mitigated.

To handle this type of co-channel interference, several power-control related ideas have been proposed, in particular those with coordinated power control. One example is "Advanced power control techniques for interference mitigation in dense 802.11 networks", O. Oteri et al, 16th International Symposium on Wireless Personal Multimedia Communications (WPMC), 2013. Here, a coordination between AP and STAs in an OBSS is described which allows for scheduling high-power transmissions in different time slots. This type of solution may be limited in dense deployment scenarios since the overlapping high-power transmission become frequent as the number of co-channel STAs increases. Other types of solutions based on coordinated power control, on the other hand, may sacrifice the SINR towards the STAs.

In the IEEE 802.11ac WLAN standard, beamforming and determining how to radiate energy in a desired direction is described. This is performed using a channel sounding procedure based on a Null Data Packet, NDP. The channel sounding procedure based on NDP is shown in FIG. 1.

Initially, a beamforming AP will transmit a NDP Announcement Frame, AF, in a first time slot. This is performed in order to gain control of the channel, i.e. the contention-based transmission resources. The targeted STA will respond to the AF, while other STAs will defer channel access in order not to interfere. The format of the AF according to the IEEE 802.11ac WLAN standard is shown in FIG. 2.

Then, the beamforming AP transmits a NDP frame in a subsequent second time slot. The format of the NDP frame according to the IEEE 802.11ac WLAN standard is shown in FIG. 3. Here, it may be seen that the NDP frame is equivalent to a regular frame in the wireless communications network 100, but with no data payload part. The NDP frame mainly comprises training signals through which the channel towards the beamforming AP may be well estimated by the targeted STA.

The targeted STA will then estimate the channel towards the beamforming AP through the training part of the received NDP frame and transmit the result of the channel estimation in a subsequent third time slot. The result of the channel estimation may be carried in a so-called Feedback Frame as shown in FIG. 1. Upon receiving the result of the channel estimation, the beamforming AP may determine the beamforming directions.

US2004/0056204 A1 describes method for interference alignment in an OBSS of a WLAN which uses the above mentioned beamforming and channel sounding procedure based on NDP in order to handle interference in the OBSS. However, the method does not take all interference that may occur in the OBSS into account when performing the interference alignment. Hence, the achievable interference mitigation is limited.

SUMMARY

It is an object of embodiments herein to improve channel estimation in a wireless communications network.

According to a first aspect of embodiments herein, the object is achieved by a method performed by a network node for enabling channel estimation in a wireless communications network. The wireless communications network comprises at least a first and a second Access Point, AP, having overlapping cells using contention-based transmission resources of the same frequency. The network node controls the first AP to transmit information indicating that wireless devices served by the first AP are not to contend for the contention-based transmission resources when the second AP is transmitting a Null Data Packet, NDP. Then, the network node controls the second AP to transmit a NDP.

According to a second aspect of embodiments herein, the object is achieved by a network node for enabling channel estimation in a wireless communications network. The wireless communications network comprises at least a first and a second AP having overlapping cells using contention-based transmission resources of the same frequency. The network node comprising a processor configured to control the first AP to transmit information indicating that wireless devices served by the first AP are not to contend for the contention-based transmission resources when the second AP is transmitting a NDP. The processor is further configured to control the second AP to transmit a NDP.

According to a third aspect of embodiments herein, the object is achieved by a method performed by a wireless device for enabling channel estimation in a wireless communications network. The wireless communications network comprises at least a first and a second AP serving overlapping cells using contention-based transmission resources of the same frequency. The wireless device receives information from the first AP indicating that the wireless device is not to contend for the contention-based transmission resources when the second AP is transmitting a NDP. Then, the wireless device refrains from or suppresses contending for the contention-based transmission resources when the second AP is transmitting a NDP according to the received information.

According to a fourth aspect of embodiments herein, the object is achieved by a second network node for enabling channel estimation in a wireless communications network. The wireless communications network comprises at least a first and a second AP serving overlapping cells using contention-based transmission resources of the same frequency. The wireless device comprising a processor configured to receive information from the first AP indicating that the wireless device is not to contend for the contention-based transmission resources when the second AP is transmitting a NDP. The processor is further configured to refrain from or suppress contending for the contention-based transmission resources when the second AP is transmitting a NDP according to the received information.

According to a fifth aspect of embodiments herein, the object is achieved by a computer program, comprising instructions which, when executed on at least one processor, cause the at least one processor to carry out the method described above. According to a sixth aspect of embodiments herein, the object is achieved by a carrier containing the computer program described above, wherein the carrier is one of an electronic signal, optical signal, radio signal, or computer readable storage medium.

By controlling a first AP to transmit information indicating to its wireless devices that they are not to contend for the contention-based transmission resources when the second AP is transmitting a NDP, the network node is able to inform them about the upcoming NDP from the second AP and keep them silent when the second AP transmits the NDP.

Since the wireless devices served by the first AP will be silent, no transmissions from the wireless devices served by the first AP will interfere with the channel estimation based on the NDP from the second AP in the wireless devices served by the second AP 111. Also, the wireless devices served by the first AP will also be able to estimate the interference channel towards the second AP based on the NDP transmitted from the second AP. Thus, improved estimates of the channels towards the second AP based on the NDP transmitted from the second AP will be achieved.

Hence, channel estimation in the wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 7 is a signaling scheme illustrating embodiments of a network node and a wireless device, FIG. 8 is another signaling scheme illustrating embodiments of a network node and a wireless device.

DETAILED DESCRIPTION

Figure 1:
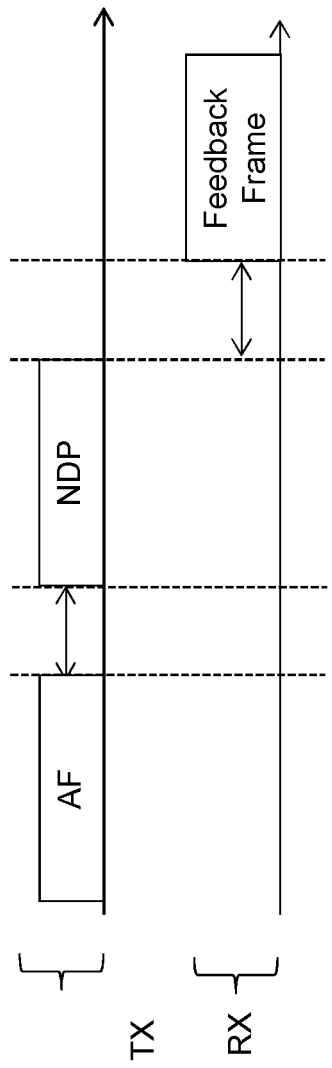
FIG. 1 is a signaling scheme illustrating a channel sounding procedure for beamforming in a wireless communications network.
Figure 2:
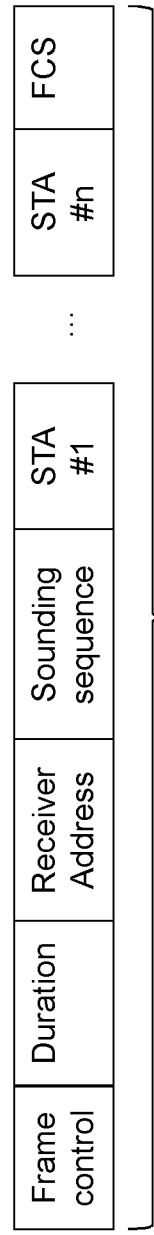
FIG. 2 is a schematic block diagram illustrating a NDP Announcement frame format.

The figures are schematic and simplified for clarity, and they merely show details which are essential to the understanding of the embodiments presented herein, while other details have been left out. Throughout, the same reference numerals are used for identical or corresponding parts or steps.

Figure 3:
FIG. 3 is a schematic block diagram illustrating a NDP frame format.
Figure 4:
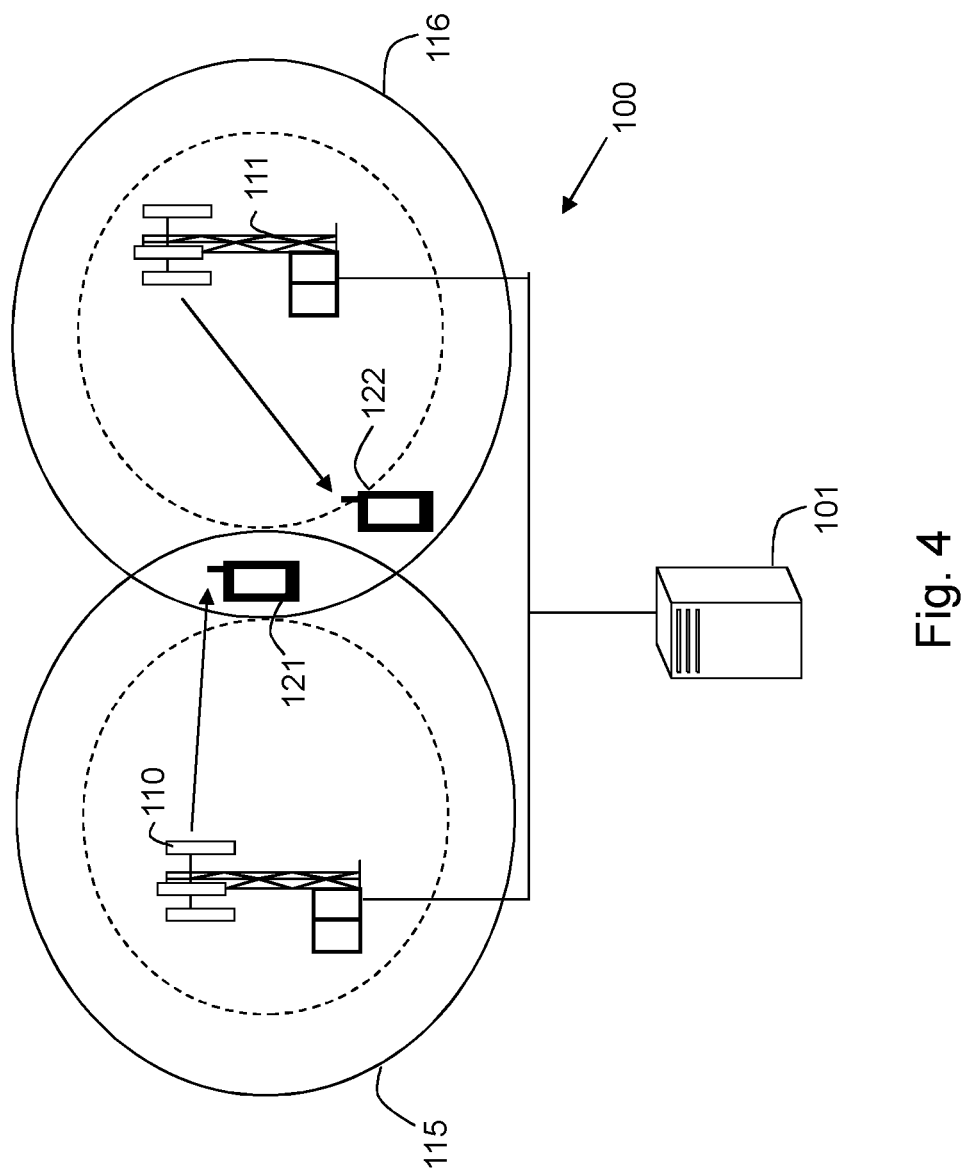
FIG. 4 is a schematic block diagram illustrating embodiments of a network node and a wireless device in a wireless communications network.

FIG. 4 shows an example of a wireless communications network 100 in which embodiments herein may be implemented. The wireless communications network 100 illustrated in FIG. 1 may be any wireless communications network using contention-based transmission resources of the same frequency. The wireless communications network 100 may comprise a first and a second Access Point, AP, 110, 111. The first and second AP 110, 111 may serve wireless devices located within their respective coverage area or cell 115, 116, respectively. The first and second AP 110, 111 may be connected to and exchange information with each other. Also, the first and second AP 110, 111 may also be connected to and exchange information via a core network node 101 in the wireless communications network 100. In the example scenario shown in FIG. 3, a first wireless device 121 is located in the overlapping area of the cells 115, 116, while a second wireless device 122 is located in the cell 116.

In some embodiments, the wireless communications network 100 may be a standardized IEEE 802.11 WLAN. According to the IEEE 802.11 WLAN standard, the first and second wireless devices 121, 122 is referred to as stations, STAs, while the cells 115, 116 and corresponding first and second AP 110, 111 is referred to as BSSs. In the example scenario shown in FIG. 4, however, the cells 115, 116 and corresponding first and second AP 110, 111 may also be referred to as OBSSs since they partly overlap each other.

In some embodiments, the wireless communications network 100 may be a cellular or radio communication system using contention-based transmission resources of the same frequency. For example, cellular or radio communication systems capable of also operating in parts of the so-called unlicensed spectrum, i.e. unlicensed frequency bands which are shared, decentralized and not licensed to a particular type of scheduled wireless or radio communication, in addition to the conventional licensed spectrum. Examples of such cellular or radio communication systems may comprise LTE, LTE-Advanced, Wideband Code-Division Multiple Access (WCDMA), Global System for Mobile communications/ Enhanced Data rate for GSM Evolution (GSM/EDGE), Worldwide Interoperability for Microwave Access (Wi-Max), Ultra Mobile Broadband (UMB) or GSM network, or other cellular network or system.

In this case, the first and second AP 110, 111 may e.g. be an eNB, eNodeB, or a Home Node B, a Home eNode B, femto Base Station (BS), pico BS or any other network unit capable to serve a wireless device in the wireless communications network 100. The first and second AP 110, 111 may also be e.g. a radio base station, a base station controller, a network controller, a relay node, a repeater, a Ultra-Dense Network/Software-Defined Network (UDN/SDN) radio access node, a Remote Radio Unit (RRU) or a Remote Radio Head (RRH). Also, the core network node 101 may e.g. be a Mobility Management Entity (MME), a Self-Organizing Network (SON) node, an Operational and Maintenance (O&M) node, an Operational Support Systems (OSS) node, a positioning node, a Enhanced Serving Mobile Location Center (E-SMLC) node, etc. Furthermore, the first and second wireless devices 121, 122 may e.g. be any kind of wireless device such as a mobile phone, a cellular phone, a Personal Digital Assistant (PDA), a smart phone, a tablet, a sensor or actuator with wireless communication capabilities, a sensor or actuator connected to or equipped with a wireless device, a Machine Device (MD), a Machine-Type-Communication (MTC) device, a Machine-to-Machine (M2M) communication device, D2D capability, a wireless device with D2D capability, a Customer-Premises Equipment (CPE), a Laptop-Mounted Equipment (LME), a Laptop-Embedded Equipment (LEE), etc.

Furthermore, although embodiments below are described with reference to FIG. 4, this should not be construed as limiting to the embodiments herein, but merely as an example made for illustrative purposes.

As part of developing the embodiments herein, it was noticed that prior art using beamforming and a channel sounding procedure based on NDP in order to handle interference in an OBSS does not take all interference into account. Hence, the achievable interference mitigation is limited.

In accordance with embodiments described herein, this issue is addressed by controlling a first AP to transmit information indicating to its wireless devices that they are not to contend for the contention-based transmission resources when the second AP is transmitting a NDP. Thus, the wireless devices served by the first AP will be informed about the NDP from the second AP and will be silent when the NDP from the second AP is transmitted. Since the wireless devices served by the first AP will be silent, no transmissions from these wireless devices will interfere with the channel estimation based on the NDP from the second AP in the wireless devices served by the second AP 111. Thus, improved estimates of the channels towards the second AP based on the NDP transmitted from the second AP will be achieved.

Furthermore, the wireless devices served by the first AP will also be able to estimate the interference channel towards the second AP based on the NDP transmitted from the second AP. Thus, estimates of the interference channel towards the second AP based on the NDP transmitted from the second AP may also be achieved.

Figure 5:
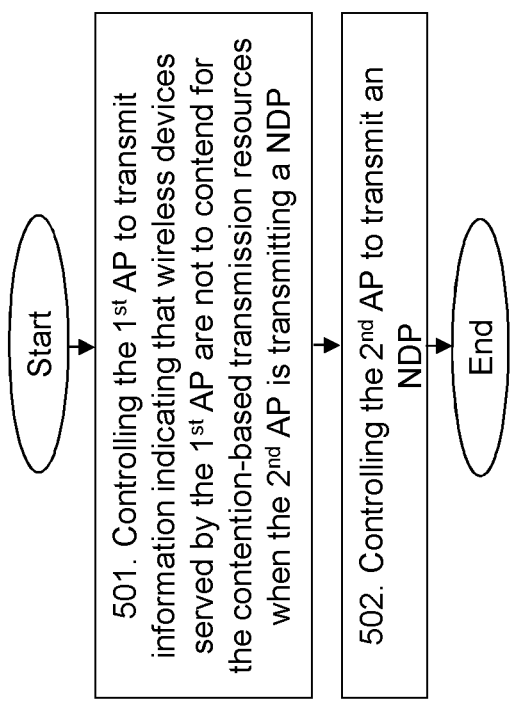
FIG. 5 is a flowchart depicting embodiments of a method in a network node.

Example of embodiments of a method performed by a network node 110, 111, 101 for enabling channel estimation in a wireless communications network 100, will now be described with reference to the flowchart depicted in FIG. 5. The wireless communications network 100 comprises at least a first and a second Access Point, AP 110, 111 having overlapping cells 115, 116 using contention-based transmission resources of the same frequency. FIG. 5 illustrates an example of actions or operations which may be taken by a network node 110, 111, 101, wherein the network node 110, 111, 101 may be either of the first AP 110, the second AP 111 or the core network node 101. The method may comprise the following actions.

Action 501

The network node 110, 111, 101 controls the first AP 110 to transmit information indicating that wireless devices served by the first AP 110 are not to contend for the contention-based transmission resources when the second AP 111 is transmitting a Null Data Packet, NDP. This means that the network node 110, 111, 101 is able to inform the wireless devices served by the first AP 110 about the upcoming NDP from the second AP 111 and keep them silent when the second AP 111 transmits the NDP. This also advantageously allows the wireless devices served by the first AP 110 to estimate the interference channel towards the second AP 111 based on the NDP transmitted from the second AP 111. Furthermore, since no transmissions from the wireless devices served by the first AP 110 will interfere with the channel estimation in the wireless devices served by the second AP 111 based on the NDP from the second AP 111, this will also lead to improved channel estimations for the second AP 111.

Figure 6:
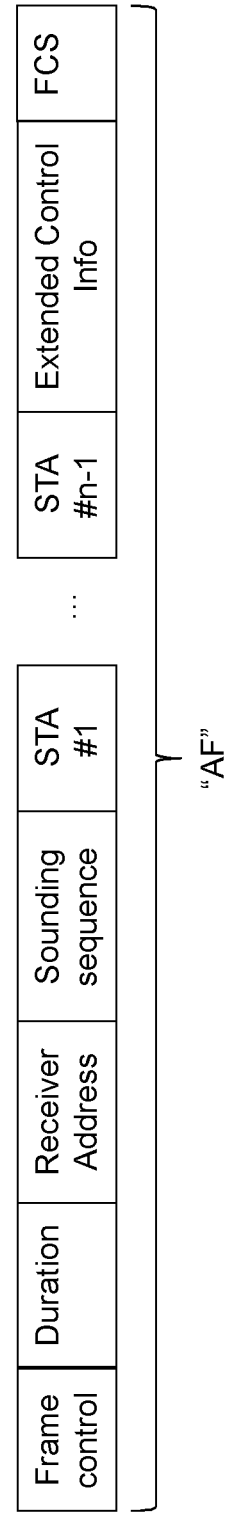
FIG. 6 is a schematic block diagram illustrating a modified NDP Announcement frame format used in embodiments of a network node and a wireless device.

In some embodiments, the information transmitted by the first AP 110 may be transmitted using a modified NDP Announcement Frame, AF, according to the IEEE 802.11ac WLAN standard. Hence, this "AF" may be referred to as a virtual or modified AF. An example of such an "AF" is shown in FIG. 6. In this example, the "Frame Control"-part of the "AF" may comprise specific information to wireless devices indicating, for example, that this "AF" is sent for interference cancellation and that one or more NDP packets from other APs is to be expected. A new "Extended Control Info"-part may be included in the "AF" which may comprise additional information. Also, the "Duration"-part may comprise one or more time options indicating that when the wireless devices should be silent for incoming NDPs.

In some embodiments, the network node 110, 111, 101 may control the first AP 110 to transmit the information when a transmission quality value and/or performance value of one or more the wireless devices served by the first AP 110 is below a determined threshold. This means that the network node 110, 111, 101 may control the first AP 110 when a transmission quality value, such as, e.g. Signal-to-Noise-plus-Interference, SINR, ratio, or a performance value, such as, e.g. system throughput, for one or more wireless devices has fallen below a threshold value. This may be performed since the interference channel towards the second AP 111 for these wireless devices in this case may benefit from being estimated and subsequently used by the network node 110, 111, 101 when mitigating the interference.

Action 502

After controlling the first AP 110 as described in Action 501, the network node 110, 111, 101 controls the second AP 111 to transmit a NDP. This may, for example, be performed according to the IEEE 802.11ac WLAN standard as previously described.

This means that the wireless devices served by the second AP 111, such as, the second wireless device 122, is able to estimate the channel towards the second AP 111 through the training signal part of the received NDP frame and transmit feedback information on the result of the channel estimation to the second AP 111. It also means that the wireless devices served by the first AP 110 receiving the NDP frame from the second AP 111 is able to, in the same manner, estimate the interference channel towards the second AP 111 based on the NDP transmitted from the second AP 111.

In some embodiments, the network node 110, 111, 101 may control the first AP 110 to further transmit information indicating when and how wireless devices served by the first AP 110 are to transmit feedback information to the second AP 111 corresponding to the NDP transmitted from the second AP 111. This means, for example, that the network node 110, 111, 101 may control when the wireless devices served by the first AP 110 will transmit feedback information comprising the result of the channel estimation based on the NDP from the second AP 111 to the second AP 111. For example, the information in Action 501 may further indicate a time slot at which a wireless device served by the first AP 110 is to transmit the feedback information to the second AP 111. Optionally, the network node 110, 111, 101 may use Report Poll frames to later trigger the wireless devices served by the first AP 110 is to transmit the feedback information to the second AP 111. Alternatively, in the same manner, the wireless devices served by the first AP 110 may instead transmit the feedback information to the first AP 110. It should be noted that regardless of which of the first or second AP 110, 111 actually receives the feedback information, this feedback information may be provided to and used by the network node 110, 111, 101, e.g. for interference mitigation as describe below.

It also means that the network node 110, 111, 101 may control how the wireless devices served by the first AP 111, such as, the first wireless device 121, will transmit the result of the channel estimation based on the NDP transmitted from the second AP 111 to the second AP 111. In some embodiments, the result of the channel estimation may, for example, be transmitted to the second AP 111 by reusing the Compressed Beamforming Report frame in the IEEE 802.11ac WLAN standard. The feedback information may be carried in a so-called Feedback Frame.

Given the estimations of the interference channel from the wireless devices served by the first AP 110 to the second AP 111, the network node 110, 111, 101 may determine how to efficiently suppress or mitigate the interference from the second AP 111 for the wireless devices served by the first AP 110. This may be performed using existing techniques for interference suppression, such as, for example, MU-MIMO precoding. Examples of existing MIMO precoding methods may, for example, be seen in "Generalized design of multi-user MIMO precoding matrices", V. Stankovic and M. Haardt, IEEE Trans. Wireless Communications, March 2008 and the references therein. Thus, for example, based on the estimations of the interference channel from the wireless devices served by the first AP 110 to the second AP 111, a precoding determined by the network node 110, 111, 101 for the second AP 111 together with a decoding at the wireless devices served by the first AP 110 may not only suppress the interference from the second AP 111, but also enhance desired signal transmissions from the first AP 110.

This is further illustrated in by following example. Consider the first and second AP 110, 111 operating on the same frequency and having overlapping cells, as shown in example scenario in FIG. 3. At a time instant t, a transmitted signal $S_{1,t}$ from the first AP 110 to the first wireless device 121 in cell 115 may be interfered by a transmitted signal $S_{2,t}$ from the second AP 111 to the second wireless device 122 in cell 116. Thus, at the first wireless device 121, the received signal will comprise the desired transmitted signal $S_{1,t}$ from the first AP 110, the undesired transmitted signal $S_{2,t}$ from the second AP 111, i.e. interference, and most likely some noise. The received signal at time t at the first wireless device 121 may then be expressed as Eq. 1:

$$R_t = H_1 \cdot S_{1,t} + H_2 \cdot S_{2,t} + W_{1,t} \tag{Eq. 1}$$

wherein $H_1$ denotes the channel response from the first AP 110 to the first wireless device 121, $H_2$ denotes the channel response from the second AP 111 to the first wireless device 121, and $W_{1,t}$ denotes the added white noise with variance $\sigma_w^2$. Then, for a general case and assuming K−1 number of interfering signals from neighbouring or nearby cells, the received signal at time t at the first wireless device 121 may be expressed as Eq. 2:

$$R_t = H_1 \cdot S_{1,t} + \sum_{j \neq i}^{K} H_j \cdot S_{j,t} + W_{j,t} \tag{Eq. 2}$$

From Eq. 2, it may be seen that if the channel response of the interfering signals from neighbouring or nearby cells, $H_j$, is available at the first wireless device 121, then interference from the neighbouring or nearby cells may be efficiently mitigated.

In some embodiments, the network node 110, 111, 101 may control the first AP 110 to transmit the information in a first time slot, control the second AP 111 to transmit, in the first time slot or a second subsequent time slot, information indicating to wireless devices served by the second AP 111 that the second AP 111 is going to transmit the NDP in a third subsequent time slot, and control the second AP 111 to transmit the NDP in the third subsequent time slot. FIG. 7 shows an example of a signaling scheme describing these embodiments in more detail.

In a first time slot, the network node 110, 111, 101 may control the first AP 110 to transmit information indicating to the first wireless devices 121 in the cell 115 that it is not to contend for the contention-based transmission resources when the second AP 111 is transmitting a NDP. The information transmitted by the first AP 110 may be transmitted in an "AF", i.e. the "virtual" or modified AF, as shown by the dotted part in FIG. 7.

The network node 110, 111, 101 may then control the second AP 111 to transmit an NDP to the second wireless device 122 in the cell 116 according to the IEEE 802.11ac WLAN standard. This means that the second AP 111 will transmit a conventional AF in a 20 second subsequent time slot, i.e. information indicating to wireless devices served by the second AP 111 that the second AP 111 is going to transmit the NDP, and transmit an NDP frame in a third subsequent time slot. When the second AP 111 transmits the NDP in the third subsequent time slot to the second wireless device 122, the first wireless device 121 will, according to the information in the "AF", not contend for the contention-based transmission resources according to the received information from the first AP 110. This is shown by the dashed part in FIG. 7. However, since located in the overlapping area of the cells 115, 116, the first wireless device 121 may receive the NDP frame from the second AP 111 in the third subsequent time slot. Based on this NDP frame, the first wireless device 121 may consequently estimate the inference channel towards the 30 second AP 111 through the training part of the NDP frame received from the second AP 111 and transmits feedback information on the result of the channel estimation to the second AP 110 in a fourth subsequent time slot. This may be performed using a Feedback Frame as shown in FIG. 7.

One advantage with this signalling scheme is that the "AF" transmitted from the first AP 110 and the conventional AF transmitted from the second AP 111 will not interfere with each other. It should also be noted that time slots according to the IEEE 802.11ac WLAN standard may be separated by a Short Inter Frame Space, SIFS, as shown in FIG. 7.

In some embodiments, when the second AP 111 is controlled to transmit the information in the first time slot, the network node 110, 111, 101 may multiplex the information transmitted by the second AP 111 in the frequency or code domain with the information transmitted by the first AP 110. FIG. 8 shows an example of a signaling scheme describing these embodiments in more detail.

In this example, the network node 110, 111, 101 may control the second AP 111 to transmit the conventional AF in the same time slot as the transmission of the "AF" from the first AP 110, i.e. simultaneously in the first time slot. Here, in order to avoid interference between the "AF" and the conventional AF in the first time slot, the signaling information of the "AF" and the conventional AF may be multiplexed in the frequency domain, such as, for example, in an Orthogonal Frequency-Division Multiple Access, OFDMA, manner wherein one AF is allocated odd-numbered subcarriers and the other AF is allocated even-numbered subcarriers. Alternatively, the signaling information of the "AF" and the conventional AF may be multiplexed in the code domain, such as, for example, applied with orthogonal codes so as to be separable by the first wireless device 121.

Figure 9:
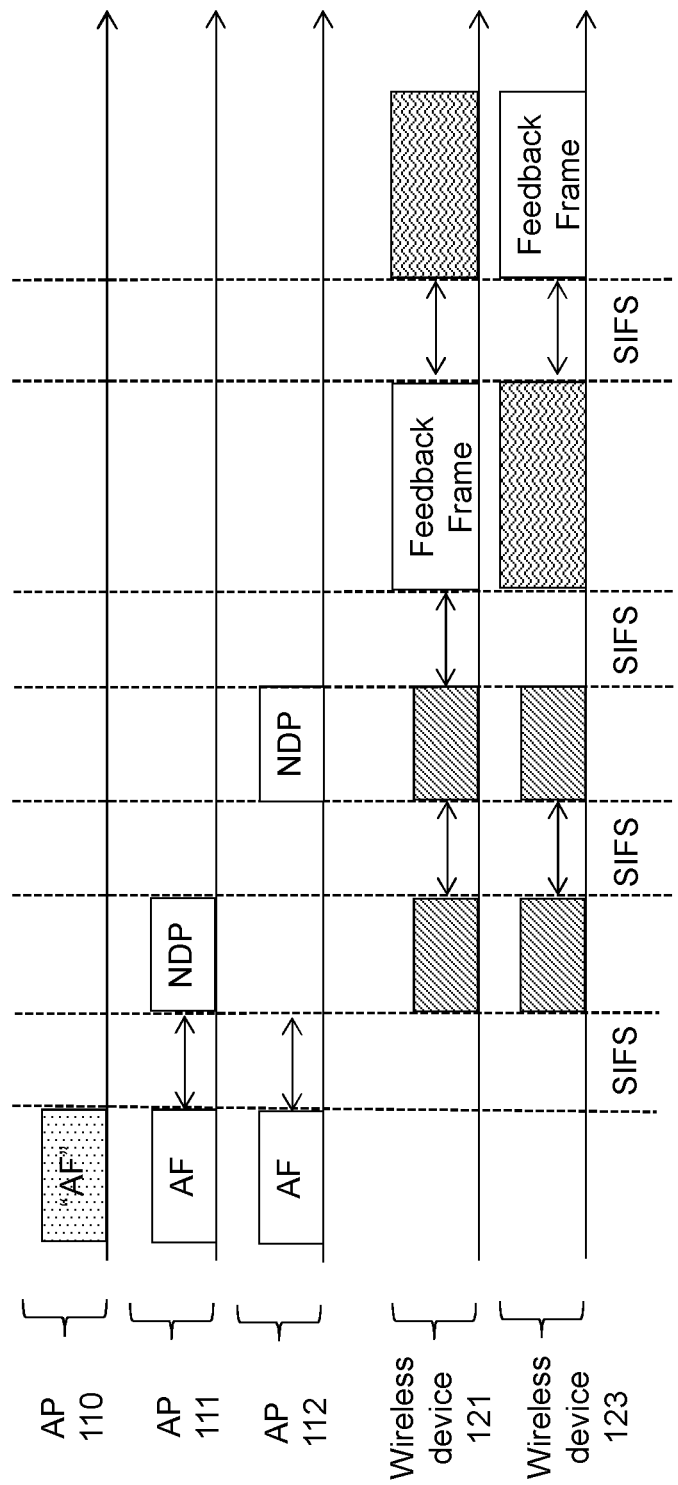
FIG. 9 is a further signaling scheme illustrating embodiments of a network node and a wireless device.

FIG. 9 shows an example of a signaling scheme according to some embodiments of the network node 110, 111, 101. This example the wireless communications network 100 further comprises a third AP 112 (not shown in FIG. 4) which has a third cell 117 that also overlaps with cells 115, 116 of the first and second AP 110, 111 and also uses the contention-based transmission resources of the same frequency. In this example, the wireless devices served by the first AP 110 are the first wireless device 121 and a third wireless device 123 (also not shown in FIG. 4).

Here, transmissions by the first AP 110 in cell 115 are assumed to be interfered by transmissions from the second AP 111 in cell 116 and from the third AP 112 in the third cell 117. Here, the network node 110, 111, 101 may, for example, control the second and third AP 111, 112 to transmit a conventional AF in the same time slot as the transmission of the "AF" from the first AP 110. This may be performed simultaneously the first time slot using, for example, multiplexing as described in previous embodiments. However, also note that the "AF" from the first AP 110 and the conventional AFs from the second and third AP 111, 112 may also be transmitted in separate subsequent time slots, e.g. as shown in the example of FIG. 7. Upon receiving the conventional AFs, the second and third AP 111, 112 will transmit their NDP frames in different time slots, while the wireless devices served by the first AP 110 is silent in these time slots according to the information in the "AF". This is shown by dashed parts in FIG. 9.

The network node 110, 111, 101 may also control each of the wireless devices served by the first AP 110 to, after having received the NDPs from the second and third APs 111, 112, remain silent while the other wireless devices served by the first AP 110 and/or the wireless devices served by the second AP 110 transmits its feedback information on the result of the channel estimation to the second AP 111. This is shown by the wavy parts in FIG. 9. The feedback information from each of the wireless devices served by the first AP 110 and/or the wireless devices served by the second AP 110 may be sent in separate subsequent time slots to the second AP 111. However, this type of sequential feedback information may result in large delays as the number of involved wireless device served by the first AP 110 increases. In order to reduce this type of delay, the feedback information from the wireless devices served by the first AP 110 and/or the wireless devices served by the second AP 110 may be multiplexed in frequency domain. For example, the Feedback frame from the first wireless device 121 may be transmitted using a lower part of available subcarriers and the Feedback frame from the third wireless device 123 may be transmitted using a upper part of available subcarriers.

Figure 10:
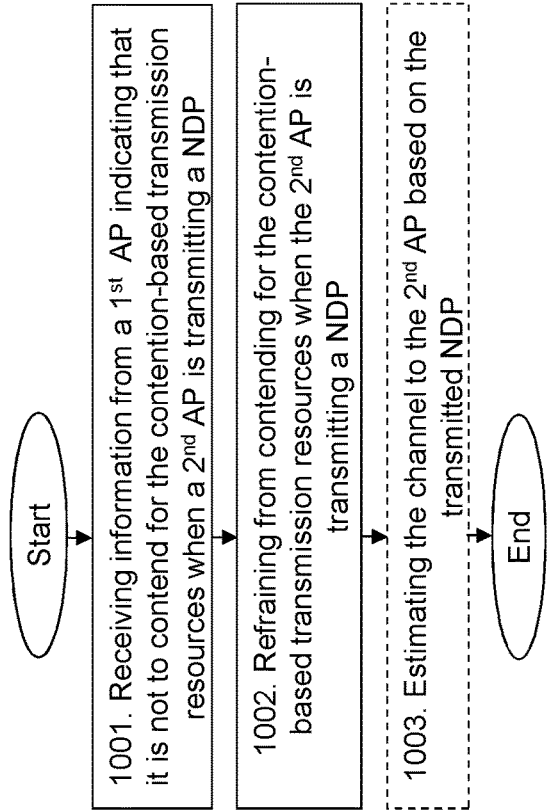
FIG. 10 is a flowchart depicting embodiments of a method in a wireless device.

Example of embodiments of a method performed by a wireless device for enabling channel estimation in a wireless communications network 100, will now be described with reference to the flowchart depicted in FIG. 10. The wireless communications network 100 comprises at least a first and a second Access Point, AP, 110, 111 serving overlapping cells 115, 116 using contention-based transmission resources of the same frequency. FIG. 10 illustrates an example of actions or operations which may be taken by the first wireless device 121 as shown in FIG. 4. The method may comprise the following actions.

Action 1001

Initially, the first wireless device 121 receives information indicating that the wireless device 121 is not to contend for the contention-based transmission resources when the second AP 111 is transmitting a Null Data Packet, NDP. This means, for example, that the wireless device 121 is informed about the upcoming NDP from the second AP 111 and should remain silent when the second AP 111 transmits the NDP. This also advantageously enables the first wireless device 121 to estimate the interference channel towards the second AP 111 based on the NDP transmitted from the second AP 111.

Action 1002

In response to receiving the information in Action 1001, the first wireless device 121 refrains from or suppresses contending for the contention-based transmission resources when the second AP 111 is transmitting a NDP according to the received information. This means that the first wireless device 121 remains silent when the second AP 111 transmits the NDP. Hence, no interference is caused by the first wireless device 121 to the transmission of NDP frame from the second AP 111 in the cell 116.

Action 1003

Optionally, in case the first wireless device 121 is located in the overlapping area of the cells 115, 116 and receives the NDP frame from the second AP 111, the first wireless device 121 may estimate the channel to the second AP 111 based on the transmitted NDP from the second AP 111. This means, for example, that the first wireless device 121 may estimate the inference channel towards the second AP 111 through the training signal part of the NDP frame received from the second AP 111. This channel estimation may be based on existing channel estimation methods; for example, least square methods, Minimum Mean Squared Error, MMSE, methods, etc.

In some embodiments, the first wireless device 121 may also transmit feedback information on the result of the channel estimation to the second AP 111. The feedback information may, for example, be expressed in the form of codebook, wherein one entry of the codebook is sent representing the channel estimation result. In some embodiments, the feedback information may, for example, be transmitted to the second AP 111 by reusing the Compressed Beamforming Report frame in the IEEE 802.11ac WLAN standard. Optionally, the first wireless device 121 may transmit the feedback information to the first AP 110.

In some embodiments, the first wireless device 121 may also receive information indicating when and how the first wireless device 121 is to transmit feedback information to the second AP 111 corresponding to the NDP transmitted from the second AP 111. This may be included in the information received in Action 1001.

Figure 11:
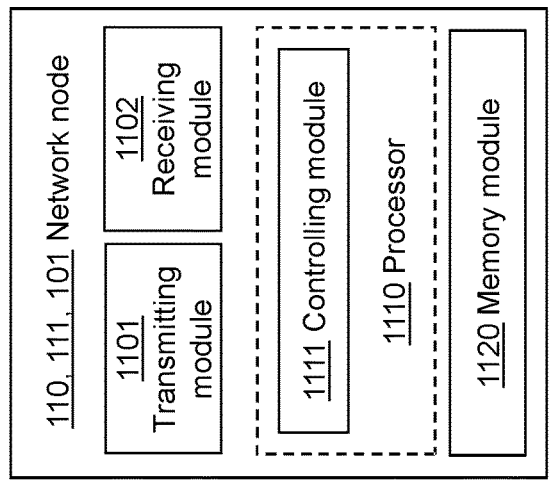
FIG. 11 is a schematic block diagram depicting embodiments of a network node.

To perform the method actions for enabling channel estimation in a wireless communications network 100, the network node 110, 111, 101 may comprise the following arrangement depicted in FIG. 11. The wireless communications network 100 comprises at least a first and a second Access Point, AP 110, 111 having overlapping cells 115, 116 using contention-based transmission resources of the same frequency.

FIG. 11 shows a schematic block diagram of embodiments of the network node 110, 111, 101. In some embodiments, the network node 110, 111, 101 may comprise a receiving module 1101, a transmitting module 1102, and a processor 1110. The receiving module 1101 may also be referred to as a receiver or receiving unit, and the transmitting module 1102 may also be referred to as transmitter or transmitting unit.

The processor 1110 may also be referred to as processing module, processing unit or processing circuitry. The processor 1110 is configured to, or a controlling module 1111 in the network node 110, 111, 101 is configured to, control the first AP 110 to transmit information indicating that wireless devices 121 served by the first AP 110 are not to contend for the contention-based transmission resources when the second AP 111 is transmitting a Null Data Packet, NDP. The processor 810 may also control the receiver 1101 and the transmitter 1102. Optionally, the processor 810 may be said to comprise one or more of the receiver 1101 and the transmitter 1102, and/or perform the function thereof as described below. Also, the processor 1110 is configured to, or a controlling module 1111 in the network node 110, 111, 101 is configured to, control the second AP 111 to transmit a NDP.

In some embodiments, the processor 1110 may be further configured to, or the controlling module 1111 in the network node 110, 111, 101 may be further configured to, control the first AP 110 to transmit the information in a first time slot, to control the second AP 111 to transmit, in the first time slot or a second subsequent time slot, information indicating to wireless devices served by the second AP 111 that the second AP 111 is going to transmit the NDP in a third subsequent time slot, and to control the second AP 111 to transmit the NDP in the third subsequent time slot.

In some embodiments, when the second AP 111 is controlled to transmit the information in the first time slot, the processor 1110 may be further configured to, or the controlling module 1111 in the network node 110, 111, 101 may be further configured to, multiplex the information transmitted by the second AP 111 in the frequency or code domain with the information transmitted by the first AP 110.

In some embodiments, the processor 1110 may be further configured to, or the controlling module 1111 in the network node 110, 111, 101 may be further configured to, control the first AP 110 to transmit the information in a first time slot, to control the first AP 110 and the second AP 111 when a transmission quality value and/or performance value of the wireless devices 121 served by the first AP 110 is below a determined threshold.

In some embodiments, the processor 1110 may be further configured to, or the controlling module 1111 in the network node 110, 111, 101 may be further configured to, control the first AP 110 to further transmit information indicating when and how wireless devices served by the first AP 110 are to transmit feedback information to the second AP 111 corresponding to the NDP transmitted from the second AP 111.

The embodiments for enabling channel estimation in a wireless communications network 100 may be implemented through one or more processors, such as, e.g. the processor 1110 in the network node 110, 111, 101 depicted in FIG. 11, together with computer program code for performing the functions and actions of the embodiments herein. The program code mentioned above may also be provided as a computer program product, for instance in the form of a data carrier carrying computer program code or code means for performing the embodiments herein when being loaded into the processor 810 in the network node 110, 111, 101. The computer program code may e.g. be provided as pure program code in the network node 110, 111, 101 or on a server and downloaded to the network node 110, 111, 101. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blue-ray disc, etc.

The network node 110, 111, 101 may further comprise a memory 1120, which may be referred to or comprise one or more memory modules or units. The memory 1120 may be arranged to be used to store executable instructions and data to perform the methods described herein when being executed in or by the processor 1110 of the network node 110, 111, 101. Those skilled in the art will also appreciate that the processor 1110 and the memory 1120 described above may refer to a combination of analog and digital circuits, and/or one or more processors configured with software and/or firmware, e.g. stored in the memory 1120, that when executed by the one or more processors, such as, the processor 1110, cause the one or more processors to perform the method as described above. The processor 1110 and the memory 1120 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 1110, cause the at least one processor to carry out the method for enabling channel estimation in a wireless communications network 100. Also, some embodiments may further comprise a carrier containing said computer program product, wherein the carrier is one of an electronic signal, optical signal, radio signal, or computer-readable storage medium.

Figure 12:
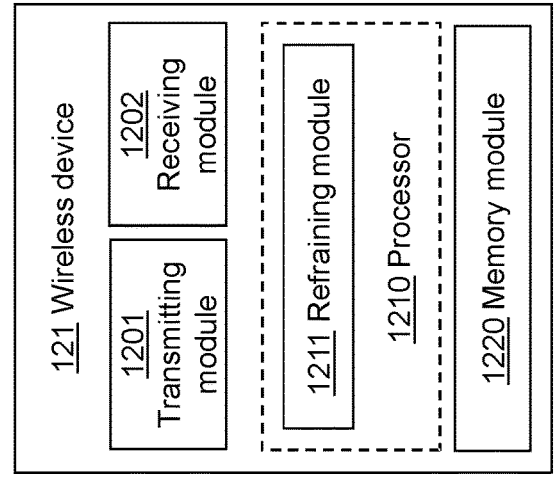
FIG. 12 is a schematic block diagram depicting embodiments of a wireless device.

To perform the method actions for enabling channel estimation in a wireless communications network 100, the wireless device 121 may comprise the following arrangement depicted in FIG. 12. The wireless communications network 100 comprises at least a first and a second Access Point, AP 110, 111 having overlapping cells 115, 116 using contention-based transmission resources of the same frequency.

FIG. 12 shows a schematic block diagram of embodiments of the wireless device 121. In some embodiments, the wireless device 121 may comprise a receiving module 1201, a transmitting module 1202, and a processor 1210. The receiving module 1201 may also be referred to as a receiver or receiving unit, and the transmitting module 1202 may also be referred to as transmitter or transmitting unit. The processor 1210 may also be referred to as processing module, processing unit or processing circuitry.

The receiver 1201 is configured to receive information from the first AP 110 indicating that the wireless device 121 is not to contend for the contention-based transmission resources when the second AP 111 is transmitting a Null Data Packet, NDP. The processor 1210 is configured to, or a refraining module 1211 in the wireless device 121 is configured to, refrain from or suppress contending for the contention-based transmission resources when the second AP 111 is transmitting a NDP according to the received information. It should be noted that the processor 1210 may control the receiver 1201 and the transmitter 1202. Optionally, the processor 1210 may also comprise one or more of the receiver 1201 and the transmitter 1202, and/or perform the function thereof as described herein.

In some embodiments, the processor 1210 may be further configured to, or an estimating module 1212 in the second network node 111 may be further configured to, estimate the channel to the second AP 111 based on the transmitted NDP from the second AP 111. In some embodiments, the transmitter 1202 may also be configured to transmit feedback information on the result of the channel estimation to the first AP 110.

The embodiments for enabling channel estimation in a wireless communications network 100 may be implemented through one or more processors, such as, e.g. the processor 1210 in the wireless device 121 depicted in FIG. 12, together with computer program code for performing the functions and actions of the embodiments herein. The program code mentioned above may also be provided as a computer program product, for instance in the form of a data carrier carrying computer program code or code means for performing the embodiments herein when being loaded into the processor 1210 in the wireless device 121. The computer program code may e.g. be provided as pure program code on the wireless device 121 or on a server and downloaded to the wireless device 121. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blue-ray disc, etc.

The wireless device 121 may further comprise a memory 1220, which may be referred to or comprise one or more memory modules or units. The memory 1220 may be arranged to be used to store executable instructions and data to perform the methods described herein when being executed in or by the processor 1210 of the wireless device 121. Those skilled in the art will also appreciate that the processor 1210 and the memory 1220 described above may refer to a combination of analog and digital circuits, and/or one or more processors configured with software and/or firmware, e.g. stored in the memory 1220, that when executed by the one or more processors, such as, the processor 1210, cause the one or more processors to perform the method as described above. The processor 1210 and the memory 1220 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 1210, cause the at least one processor to carry out the method for enabling channel estimation in a wireless communications network 100. Also, some embodiments may further comprise a carrier containing said computer program product, wherein the carrier is one of an electronic signal, optical signal, radio signal, or computer-readable storage medium.

The terminology used in the detailed description of the particular embodiments illustrated in the accompanying drawings is not intended to be limiting of the described network node 110, 111, 101, wireless device 121 and methods therein which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

Abbreviations

NDP Null Data Packet
AP Access Point
MU-MIMO Multiple-User Multiple-Input Multiple-Output
OBSS Overlapping Basic Service Set
CCA Channel Assessment
DCF Distributed Coordination Function
SIFS Short Inter-Frame Space
DSC Dynamic Sensitivity Control

The invention claimed is:

1. A method performed by a network node for enabling channel estimation in a wireless communications network, the wireless communications network comprising at least a first and a second Access Point, AP, having overlapping cells using contention-based transmission resources of the same frequency, the method comprising:
controlling the first AP to transmit information when at least one of a transmission quality value and a performance value of at least one wireless device served by the first AP is below a determined threshold, the information indicating that wireless devices served by the first AP are not to contend for the contention-based transmission resources when the second AP is transmitting a Null Data Packet, NDP, and when the wireless devices served by the first AP are to transmit feedback information to the second AP corresponding to the NDP transmitted from the second AP;
controlling the second AP to transmit a NDP; and
the wireless devices served by the first AP estimating an interference channel towards the second AP based on the NDP transmitted from the second AP.

2. The method according to claim 1, further comprising controlling the first AP to transmit the information in a first time slot, and controlling the second AP to transmit, in one of the first time slot and a second subsequent time slot, information indicating to wireless devices served by the second AP that the second AP is going to transmit the NDP in a third subsequent time slot, and controlling the second AP to transmit the NDP in the third subsequent time slot.

3. The method according to claim 2, wherein, in case the second AP is controlled to transmit the information in the first time slot, the information transmitted by the second AP is multiplexed in one of a frequency domain and a code domain with the information transmitted by the first AP.

4. The method according to claim 2, further comprising controlling the first AP to further transmit information indicating how wireless devices served by the first AP are to transmit feedback information to the second AP corresponding to the NDP transmitted from the second AP.

5. The method according to claim 1, further comprising controlling the first AP to further transmit information indicating how wireless devices served by the first AP are to transmit feedback information to the second AP corresponding to the NDP transmitted from the second AP.

6. A network node for enabling channel estimation in a wireless communications network, the wireless communications network comprising at least a first and a second Access Point, AP, having overlapping cells using contention-based transmission resources of the same frequency, the network node comprising:
a processor configured to control the first AP to transmit information when at least one of a transmission quality value and a performance value of at least one wireless device served by the first AP is below a determined threshold, the information indicating that wireless devices served by the first AP are not to contend for the contention-based transmission resources when the second AP is transmitting a Null Data Packet, NDP, and when the wireless devices served by the first AP are to transmit feedback information to the second AP corresponding to the NDP transmitted from the second AP and to control the second AP to transmit a NDP; and
the wireless devices served by the first AP estimating an interference channel towards the second AP based on the NDP transmitted from the second AP.

7. The network node according to claim 6, wherein the processor is further configured to control the first AP to transmit the information in a first time slot, to control the second AP to transmit, in one of the first time slot and a second subsequent time slot, information indicating to wireless devices served by the second AP that the second AP is going to transmit the NDP in a third subsequent time slot, and to control the second AP to transmit the NDP in the third subsequent time slot.

8. The network node according to claim 7, wherein the processor is further configured to, in case the second AP is controlled to transmit the information in the first time slot, multiplex the information transmitted by the second AP in one of a frequency domain and a code domain with the information transmitted by the first AP.

9. The network node according to claim 7, wherein the processor is further configured to control the first AP to further transmit information indicating how wireless devices served by the first AP are to transmit feedback information to the second AP corresponding to the NDP transmitted from the second AP.

10. The network node according to claim 6, wherein the processor is further configured to control the first AP to further transmit information indicating how wireless devices served by the first AP are to transmit feedback information to the second AP corresponding to the NDP transmitted from the second AP.

11. The network node according to claim 6, further comprising a memory, wherein the memory contains instructions executable by the processor.

12. A method performed by a wireless device for enabling channel estimation in a wireless communications network, the wireless communications network comprising at least a first and a second Access Point, AP, serving overlapping cells using contention-based transmission resources of the same frequency, the wireless device being served by the first AP, the method comprising:
receiving information from the first AP, the information indicating that the wireless device is not to contend for the contention-based transmission resources when the second AP is transmitting a Null Data Packet, NDP, and when the wireless device served by the first AP is to transmit feedback information to the second AP corresponding to the NDP transmitted from the second AP;

one of refraining from and suppressing contending for the contention-based transmission resources when the second AP is transmitting a NDP according to the received information; and estimating an interference channel towards the second AP based on the NDP transmitted from the second AP.

13. A wireless device for enabling channel estimation in a wireless communications network, the wireless communications network comprising at least a first and a second Access Point, AP, serving overlapping cells using contention-based transmission resources of the same frequency, the wireless device being servable by the first AP, the wireless device comprising:

a processor configured to receive information from the first AP, the information indicating that the wireless device is not to contend for the contention-based transmission resources when the second AP is transmitting a Null Data Packet, NDP, and when the wireless device served by the first AP is to transmit feedback information to the second AP corresponding to the NDP transmitted from the second AP and to one of refrain from and suppress contending for the contention-based transmission resources when the second AP is transmitting a NDP according to the received information and estimate an interference channel towards the second AP based on the NDP transmitted from the second AP.

14. The wireless device according to claim 13, further comprising a memory wherein said memory contains instructions executable by said processor.

* * * * *